United States Patent
Pham et al.

(10) Patent No.: US 7,253,980 B1
(45) Date of Patent: Aug. 7, 2007

(54) TECHNIQUE FOR RECORDING BIAS CURRENT GLITCHES IN MAGNETORESISTIVE HEADS

(75) Inventors: Bac Pham, San Jose, CA (US); Xiaokun Chew, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 98 days.

(21) Appl. No.: 11/144,096

(22) Filed: Jun. 3, 2005
(Under 37 CFR 1.47)

Related U.S. Application Data

(60) Provisional application No. 60/576,856, filed on Jun. 3, 2004.

(51) Int. Cl.
G11B 5/09 (2006.01)
G11B 5/02 (2006.01)
(52) U.S. Cl. .......... 360/46; 360/66
(58) Field of Classification Search ........ None
See application file for complete search history.

(56) References Cited

U.S. PATENT DOCUMENTS 6,512,647 B1 * 1/2003 Quak et al. ............ 360/66
6,847,513 B2 * 1/2005 Clapp et al. ........... 361/58

FOREIGN PATENT DOCUMENTS

JP 2004013969 A * 1/2004

* cited by examiner

Primary Examiner—Andrea Wellington
Assistant Examiner—Dan I Davidson
(74) Attorney, Agent, or Firm—Foley & Lardner LLP

(57) ABSTRACT

Circuitry for detecting and recording latches in read bias current may include circuitry for generating a reference voltage, a pair of current to voltage converters to convert the bias and reference currents to voltage signals, a comparator to compare those two voltages, a latch to latch the compared signal, and a counter/register to count and store the number of glitches that have been detected. It may be possible to read from the register the number of detected glitches to be used in diagnosing faults in the disk drive system. In addition, it may be possible to provide a reset input to the register to zero the counter.

36 Claims, 3 Drawing Sheets

TECHNIQUE FOR RECORDING BIAS CURRENT GLITCHES IN MAGNETORESISTIVE HEADS

CROSS-REFERENCE TO RELATED APPLICATIONS

This application claims priority from U.S. Provisional Patent Application No. 60/576,856, filed Jun. 3, 2004, entitled "Means for Detecting and Latching Glitches in Read Bias that can Cause Head Damage", the contents of which are incorporated herein by reference.

BACKGROUND

In hard disk drives, data is written to and read from magnetic recording media, herein called disks. Typically, one or more disks having a thin film of magnetic material coated thereon are rotatably mounted on a spindle. A read/write head mounted on an actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk. Typically, the read/write head includes a magnetoresistive read element to read recorded data from the disk and an inductive write element to write the data to the disk.

Various types of magnetoresistive sensor technology for read elements have been developed (AMR, GMR, TuMR, for example). For each of these, a bias current is directed through a magnetoresistive sensing layer. The magnetic field stored in the adjacent disk affects the resistance of this sensing layer. With a read bias current of a known magnitude, the voltage drop across the read sensor can be measured and the resistance calculated therefrom. In this manner, the sensor can detect the changing magnetic fields of each recorded bit on the adjacent spinning magnetic disk. Over the past five years or so, with each new generation of disk drive systems having smaller spacing between the head and disk, smaller spacing between adjacent tracks on the disk, and smaller spacing between adjacent bits on a given track on the disk, more sensitive read sensors are being employed.

Unfortunately, these more-sensitive read sensors occasionally experience glitches or current spikes of relatively high magnitude in the bias current. These glitches can occur for a variety of reasons, including electrostatic discharge (ESD) shock, sparks from contact between the head and the disk, unintentional injection of current into the head, crosstalk between the read sensor and write head, and other factors. Such glitches may result in degradation, damage, or failure of the read head.

These glitches can occur while reading data or while not reading data, during transitions between various operational modes, or in various different operational conditions. Glitches may occur in heads produced by one head manufacturer using a given fabrication process while not occurring in heads of identical design using another fabrication process.

Disk drive manufacturers may typically perform a failure analysis of the disk drive system to determine why certain manufactured heads failed. It is very difficult to replicate or detect the glitch when analyzing the disk drive system in the laboratory, for a variety of reasons.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

One aspect relates to a read/write head that writes data to and reads data from an adjacent magnetic storage disk. The head includes a write transducer, a read transducer in close proximity to the write transducer, and a preamp circuit communicatively coupled to the read transducer. The preamp circuit supplies a bias current to the read transducer and the preamp circuit measures a voltage developed across the read transducer by the bias current to determine the resistance thereof in order to determine the presence of a nearby magnetic signal stored in the adjacent disk. The preamp circuit includes a storage device to store the number of times that the bias current has exceeded a predetermined magnitude.

The preamp circuit may generate a reference current of the predetermined magnitude that can be compared to the bias current. The preamp circuit may include a comparator. The preamp circuit may include a latch that latches the output of the comparator. The storage device in the preamp circuit may include a register that is incremented each time the latch detects a glitch in the read bias current greater than the predetermined magnitude. The register may be reset to zero by an external command. The preamp circuit may include a comparator that compares a signal related to the bias current to a predetermined level.

Another aspect relates to a method for recording glitches in read bias current in a read/write head. The method includes providing a read/write head having a read transducer, supplying a bias current to the read transducer, measuring a voltage developed across the read transducer by the bias current to determine the resistance thereof in order to determine the presence of a nearby magnetic signal stored in the adjacent disk, and storing the number of times that the read bias current exceeds a predetermined magnitude.

The method may further include generating a reference current of the predetermined magnitude and comparing the reference current to the bias current. The method may further include generating a compared signal from the comparison. The method may further include latching the compared signal. The method may further include incrementing a counter each time the compared signal changes from a low state to a high state. The counter may be reset to zero by an external command. The method may further include comparing the bias current to a threshold value.

Another aspect relates to a read/write head that writes data to and reads data from an adjacent magnetic storage disk. The head includes a write transducer, a read transducer in close proximity to the write transducer, and a preamp circuit communicatively coupled to the read transducer, the preamp circuit supplying a bias current to the read transducer. The preamp circuit includes a storage device to store the number of times that the bias current has passed a predetermined threshold.

Another aspect relates to a method for recording glitches in read bias current in a read/write head. The method includes providing a read/write head having a read transducer, supplying a bias current to the read transducer, measuring a voltage developed across the read transducer by the bias current to determine the resistance thereof in order to determine the presence of a nearby magnetic signal stored in the adjacent disk, and storing the number of times that the read bias current passes a predetermined threshold.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION

Reference will now be made to the accompanying drawings, which assist in illustrating the various pertinent features of the present invention. Although the present invention will now be described primarily in conjunction with disk drives, it should be expressly understood that the present invention may be applicable to other applications where recording glitches in a signal is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
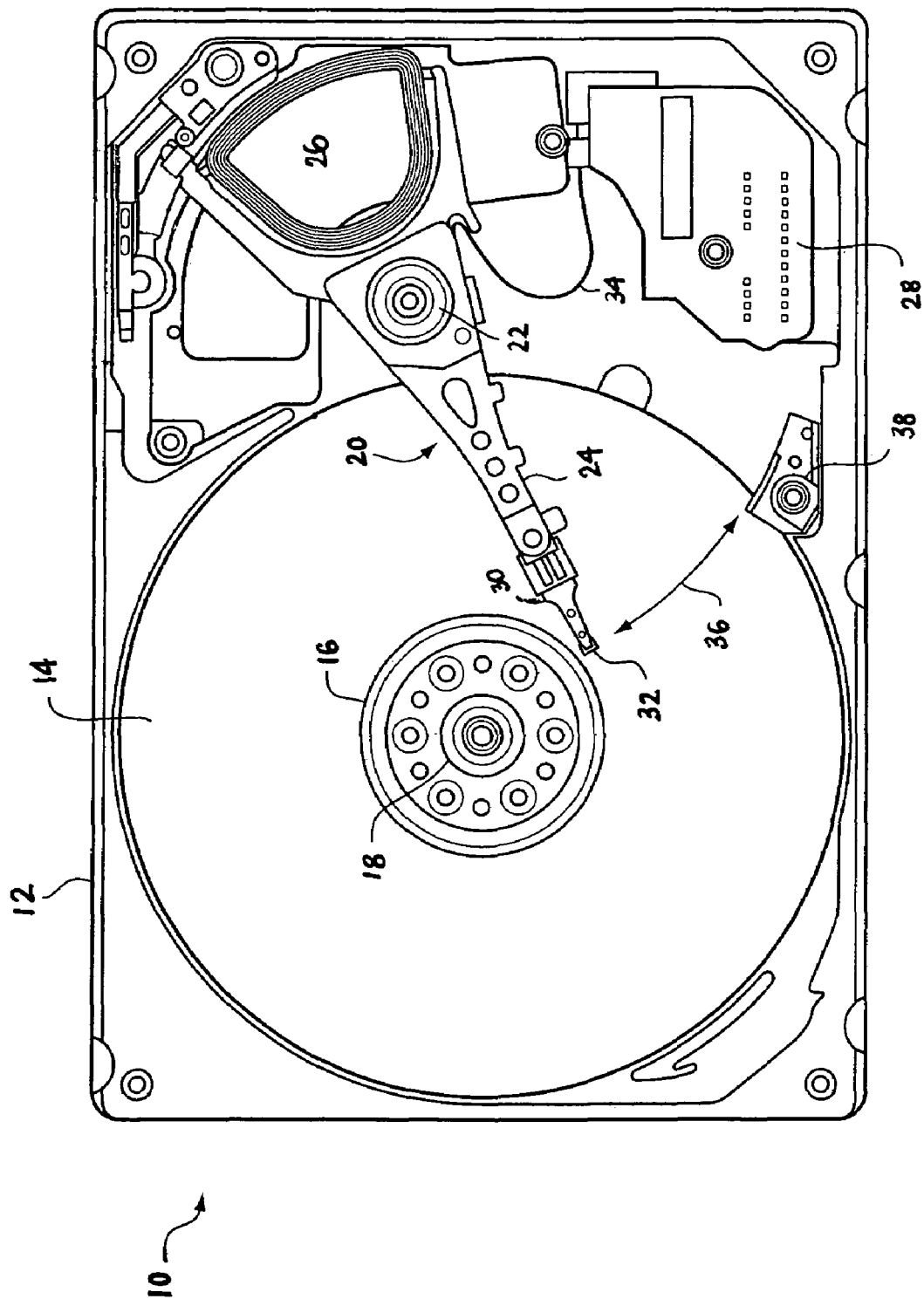
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2–4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8–12%, but can be as large as 15–20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12–25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
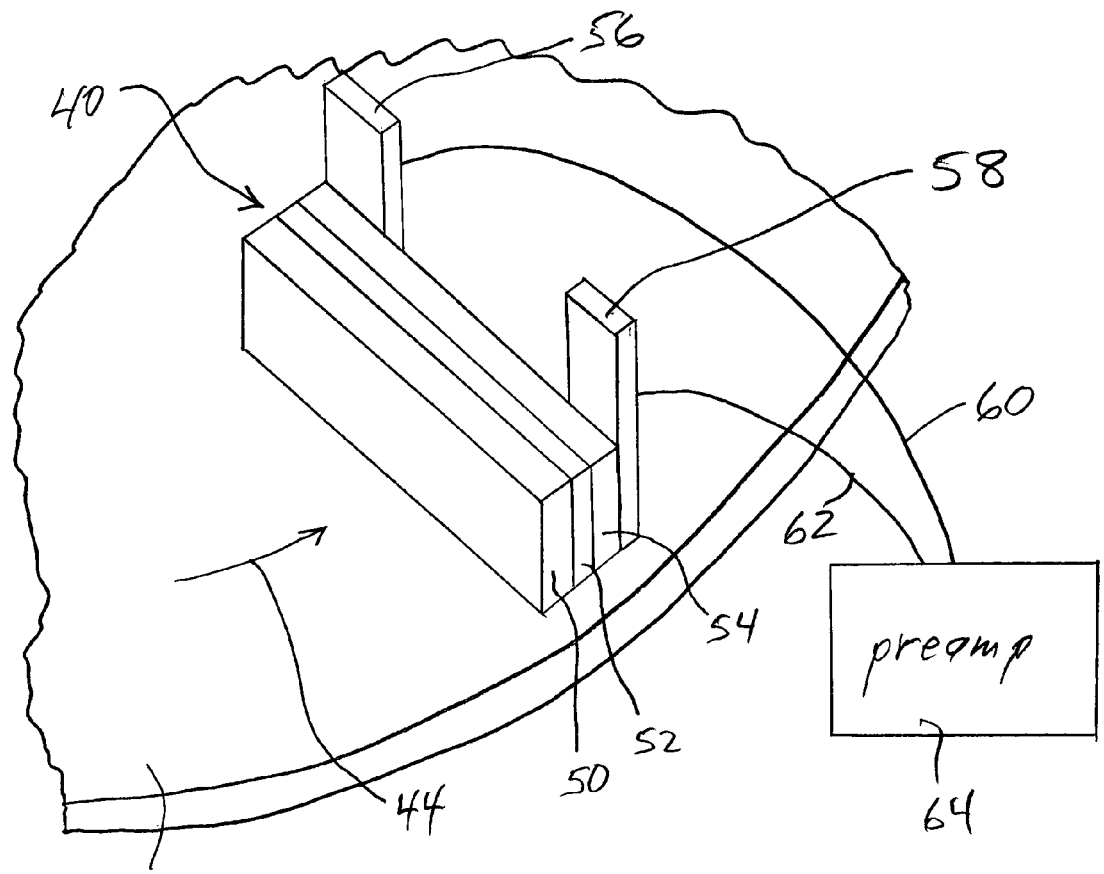
FIG. 2 is a general representation of certain layers of a GMR read sensor and preamp adjacent a magnetic storage disk.

FIG. 2 shows a portion of a read sensor 40 adjacent to a rotating magnetic storage disk 42 that is rotating in a direction shown by arrow 44. A significant portion of the read sensor 40 is omitted from the illustration of FIG. 2, for ease of illustration. Portions that are shown in FIG. 2 include a pinned layer 50, a conductive spacer layer 52, a sensing or free layer 54, and a pair of electrical contacts 56 and 58 in electrical contact with the sensing layer 54. A pair of leads 60 and 62 connect the electrical contacts 56 and 58, respectively, with a preamp circuit 64. In actuality, the number of leads between the preamp circuit 64 and the head is likely to be larger than two, as there will at least be a pair of leads for the write head as well as the possibility of leads for other functions such as positional actuators.

The preamp 64 may be located on the actuator arm of the disk drive system or on another suitable location. The major functions of the preamp 64 are conventional and well known in the disk drive art. One having skill in the art will appreciate that the preamp may be operative to generate a bias current that is supplied to the read sensor through the sensing layer 54 thereon, to measure the voltage drop between the leads 60 and 62 to determine the magnetic field sensed by the sensing layer 54, to amplify this measured voltage drop into a signal that can be provided to other circuitry in the disk drive system, and to receive data to be written to the disk drive and provide write currents to the write coil, in addition to other conventional functions. The preamp 64 described herein includes additional circuitry relevant to the technique for detecting and recording glitches described herein. Specifically, the preamp 64 not only generates a bias current ($I_{bias}$) 66, but also a reference current ($I_{ref}$) 68. The bias and reference currents 66 and 68 are provided to respective I-to-V converters 70 and 72 that convert the current signal to a voltage signal which is then provided to the positive and negative terminals of the comparator 74. The comparator 74 provides a compared signal 76 to a latch 78. The latch 78 latches the value of the compared signal 76 to create a latch signal that drives a counter/register 82. The value in the register 82 can be read therefrom as diagnostic data in order to determine the number of glitches that have been detected by the preamp by this portion of circuitry in the preamp 64. Optionally, a reset input 84 can be provided to the register 82 in order to reset the counter in order to detect future glitches.

Figure 4:
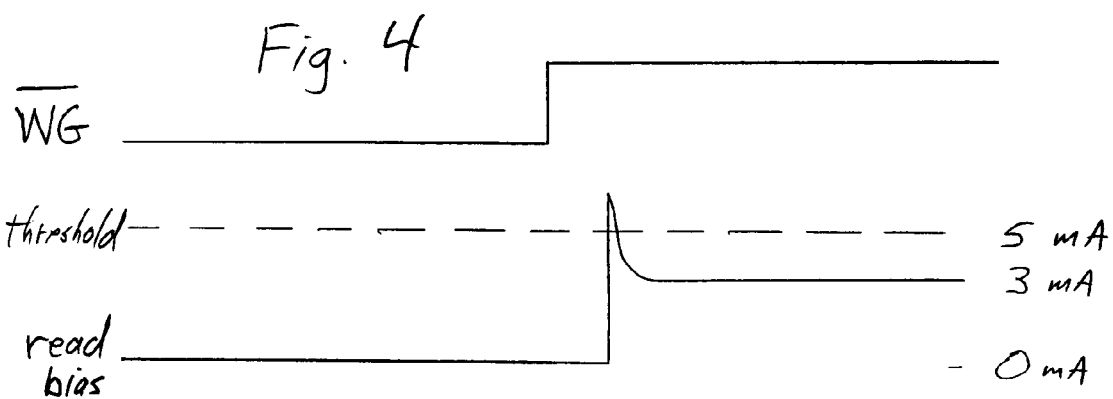
FIG. 4 is a timing diagram showing the read bias current generated by the preamp of FIG. 3.
Figure 3:
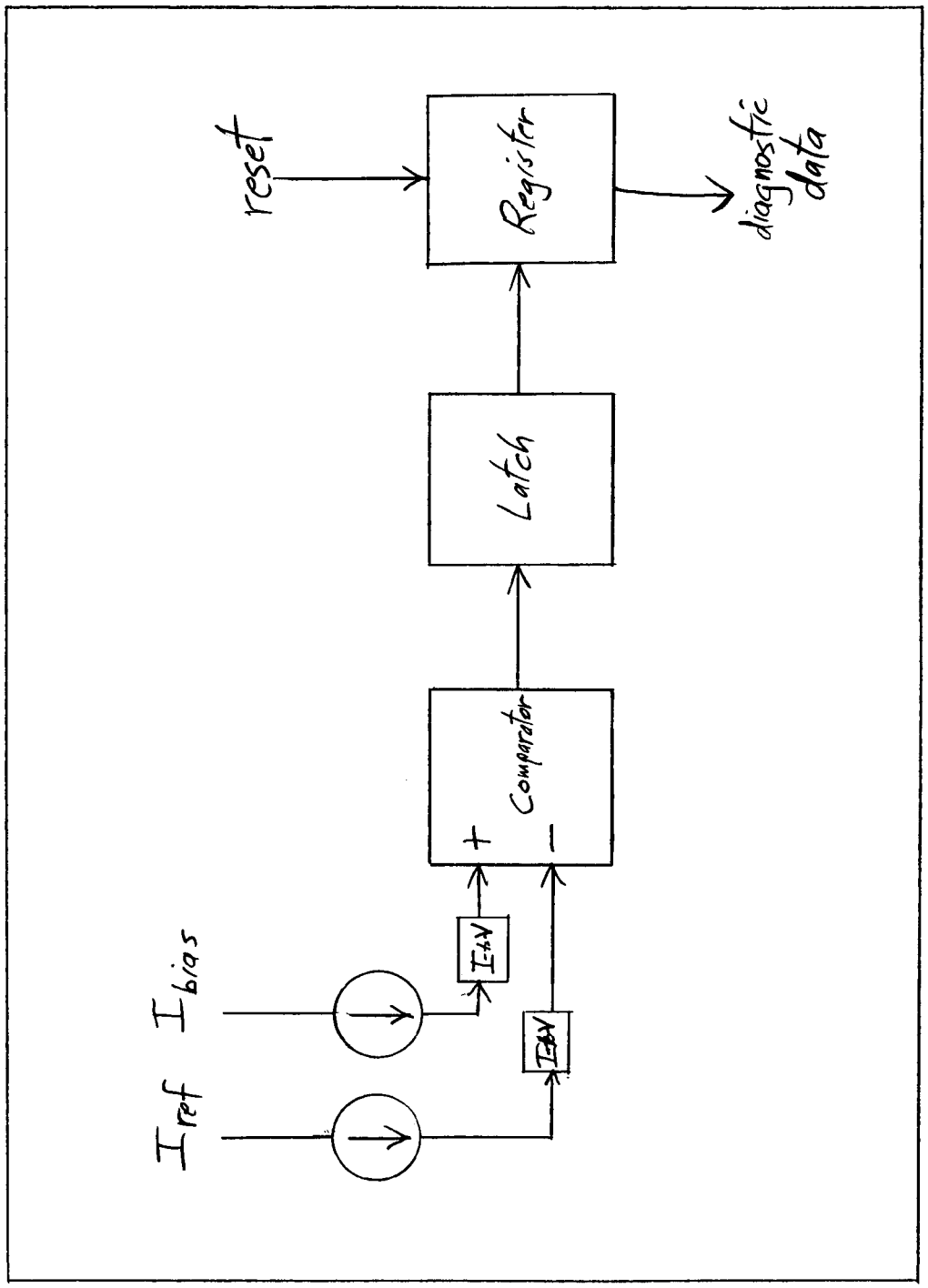
FIG. 3 is a partial schematic of the preamp, showing circuitry associated with glitch detection and counting in the preamp of FIG. 2.

If, for example, the typical bias current in the disk drive system describe herein is 3 milliamps (mA), then a reference current of some larger amount (e.g., 5 mA) may be provided. As shown in FIG. 4, a glitch in the read bias current may happen on transitioning from write mode to read mode. In this case, the NOT WRITE GATE ($\overline{WG}$) signal will go from a low to a high condition when transitioning from write mode to read mode. Shortly thereafter, the read bias current will increase from a small value (perhaps 0 mA) to the 3 mA value. In this case, however, if there is a glitch that occurs in the read bias current, a transient spike 90 of bias current 66 will rise above the threshold 92 of the reference current 68. When the bias current 66 exceeds the reference current 68 during this transient, the comparator 74 switches the condition of the compared signal 76 which is then latched by the latch 78 to create the latch signal 80 that can be edge-detected by the counter/register 82. In this manner, the number of times that the bias current has exceeded the reference current can be counted. It may only be necessary to provide a four-bit counter so that up to 15 glitches can be counted, or other suitable counters could be used. These transients or glitches may, for example, last between 0.5 and 5.0 nanoseconds.

The amount of current necessary to degrade or damage the head may vary from head to head and from design to design, and it is also a function of the amount of time that the current is applied, or the width of the current spike. For example, at 10 mA one spike may be enough to damage the head while at 5 mA it may take thousand of glitches.

It may be possible to monitor the register in the preamp while the disk drive system is being manufactured or to look at it later during failure analysis. With the reset function provided by the reset input 84, it may then be possible to zero the register and troubleshoot the disk drive system by switching between various operational modes such as write, read, head switch, servo write, sleep, idle, doze, and others. Further, the preamp can be monitored prior to shipping during a test known as the "in circuit test" (ICT) to detect faulty preamps.

It is believed that the cost to provide such circuitry and the preamp 64 would be relatively minimal as this circuitry could be realized with 100 gates or less. For example, it may be possible to generate the reference current with only a few gates, the comparator with 6–8 gates, the latch with 4 gates, the I-to-V converters with a resistor, and so forth.

The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

What is claimed is:

1. A read/write head system that writes data to and reads data from an adjacent magnetic storage disk, comprising:
    a write transducer;
    a read transducer in close proximity to the write transducer; and
    a preamp circuit communicatively coupled to the read transducer, the preamp circuit supplying a bias current to the read transducer and the preamp circuit measuring a voltage developed across the read transducer by the bias current to determine the resistance thereof in order to determine the presence of a nearby magnetic signal stored in the adjacent disk;
    wherein the preamp circuit includes a storage device to store the number of times that the bias current has exceeded a predetermined magnitude.

2. A read/write head system as defined in claim 1, wherein the preamp circuit generates a reference current of the predetermined magnitude that can be compared to the bias current.

3. A read/write head system as defined in claim 2, wherein the preamp circuit includes a comparator.

4. A read/write head system as defined in claim 3, wherein the preamp circuit includes a latch that latches the output of the comparator.

5. A read/write head system as defined in claim 4, wherein the storage device in the preamp circuit includes a register that is incremented each time the latch detects a glitch in the read bias current greater than the predetermined magnitude.

6. A read/write head system as defined in claim 5, wherein the register can be reset to zero by an external command.

7. A read/write head system as defined in claim 1, wherein the preamp circuit includes a comparator that compares a signal related to the bias current to a predetermined level.

8. A read/write head system as defined in claim 7, wherein the preamp circuit includes a latch that latches the output of the comparator.

9. A read/write head system as defined in claim 8, wherein the storage device in the preamp circuit includes a register that is incremented each time the latch detects a glitch in the read bias current greater than the predetermined magnitude.

10. A read/write head system as defined in claim 9, wherein the register can be reset to zero by an external command.

11. A method for recording glitches in read bias current in a read/write head, comprising:
    providing a read/write head having a read transducer;
    supplying a bias current to the read transducer;
    measuring a voltage developed across the read transducer by the bias current to determine the resistance thereof in order to determine the presence of a nearby magnetic signal stored in the adjacent disk; and
    storing the number of times that the read bias current exceeds a predetermined magnitude.

12. A method as defined in claim 11, further including generating a reference current of the predetermined magnitude and comparing the reference current to the bias current.

13. A method as defined in claim 12, further including generating a compared signal from the comparison.

14. A method as defined in claim 13, further including latching the compared signal.

15. A method as defined in claim 14, further including incrementing a counter each time the compared signal changes from a low state to a high state.

16. A method as defined in claim 15, wherein the counter can be reset to zero by an external command.

17. A method as defined in claim 11, further including comparing the bias current to a threshold value.

18. A method as defined in claim 17, further including incrementing a counter each time the bias current exceeds the threshold value.

19. A read/write head system that writes data to and reads data from an adjacent magnetic storage disk, comprising:
    a write transducer;
    a read transducer in close proximity to the write transducer; and
    a preamp circuit communicatively coupled to the read transducer, the preamp circuit supplying a bias current to the read transducer;
    wherein the preamp circuit includes a storage device to store the number of times that the bias current has passed a predetermined threshold.

20. A read/write head system as defined in claim 19, wherein the preamp circuit generates a reference current of a predetermined magnitude to establish the threshold that can be compared to the bias current.

21. A read/write head system as defined in claim 20, wherein the preamp circuit includes a comparator.

22. A read/write head system as defined in claim 21, wherein the preamp circuit includes a latch that latches the output of the comparator.

23. A read/write head system as defined in claim 22, wherein the storage device in the preamp circuit includes a register that is incremented each time the latch detects a glitch in the read bias current greater than the predetermined magnitude.

24. A read/write head system as defined in claim 23, wherein the register can be reset to zero by an external command.

25. A read/write head system as defined in claim 19, wherein the preamp circuit includes a comparator that compares a signal related to the bias current to the predetermined threshold.

26. A read/write head system as defined in claim 25, wherein the preamp circuit includes a latch that latches the output of the comparator.

27. A read/write head system as defined in claim 26, wherein the storage device in the preamp circuit includes a register that is incremented each time the latch detects a glitch in the read bias current greater than the predetermined magnitude.

28. A read/write head system as defined in claim 27, wherein the register can be reset to zero by an external command.

29. A method for recording glitches in read bias current in a read/write head, comprising:
   providing a read/write head having a read transducer;
   supplying a bias current to the read transducer;
   measuring a voltage developed across the read transducer by the bias current to determine the resistance thereof in order to determine the presence of a nearby magnetic signal stored in the adjacent disk; and
   storing the number of times that the read bias current passes a predetermined threshold.

30. A method as defined in claim 29, further including generating a reference current having a predetermined magnitude to establish the threshold and comparing the reference current to the bias current.

31. A method as defined in claim 30, further including generating a compared signal from the comparison.

32. A method as defined in claim 31, further including latching the compared signal.

33. A method as defined in claim 32, further including incrementing a counter each time the compared signal changes from a low state to a high state.

34. A method as defined in claim 33, wherein the counter can be reset to zero by an external command.

35. A method as defined in claim 29, further including comparing the bias current to the threshold.

36. A method as defined in claim 35, further including incrementing a counter each time the bias current passes the threshold.

* * * * *